UNITED STATES PATENT OFFICE.

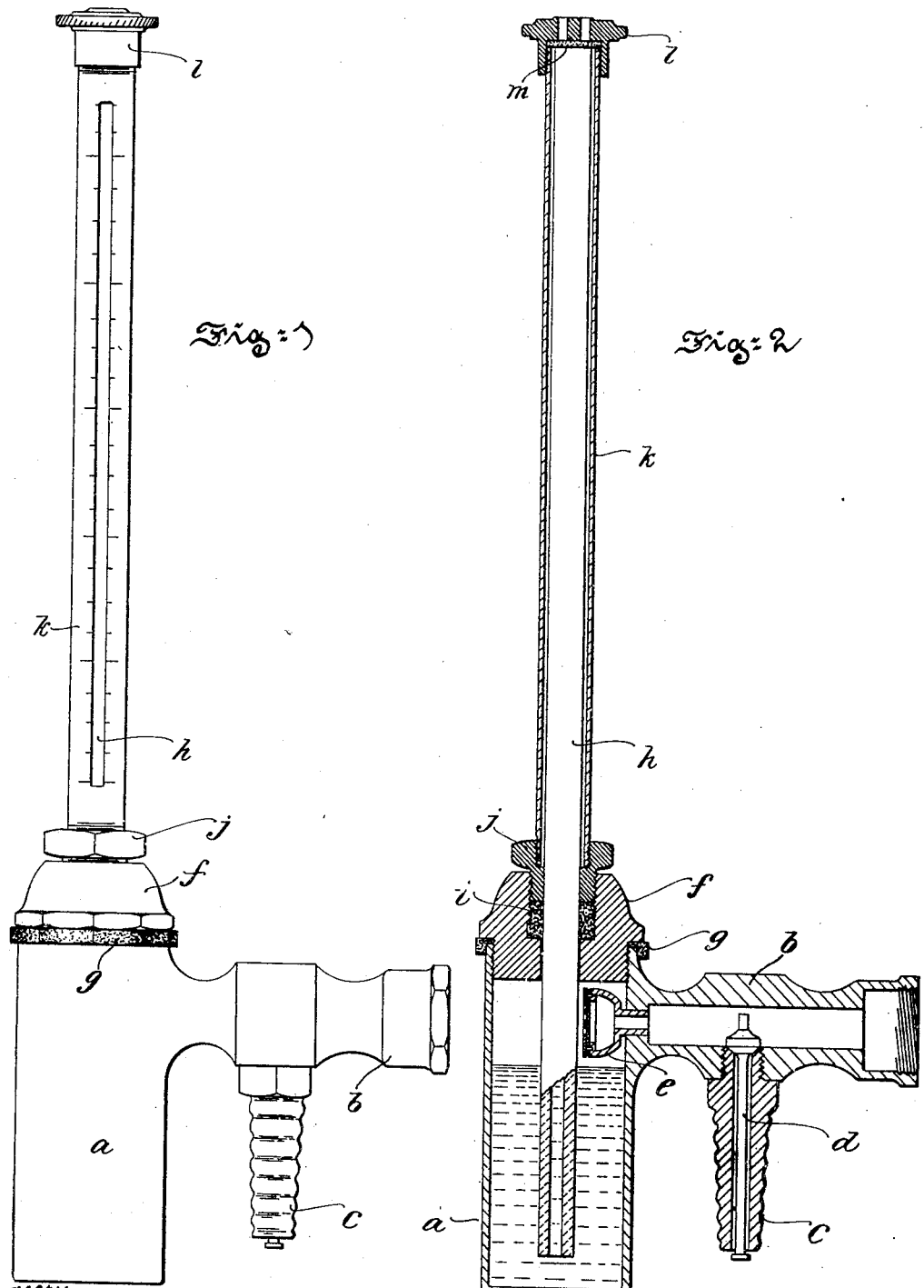

HARRY C. RAMSBERGER, OF PHILADELPHIA, PENNSYLVANIA.

MERCURY PRESSURE-GAGE.

No. 803,786.  Specification of Letters Patent.  Patented Nov. 7, 1905.

Application filed April 29, 1905. Serial No. 258,094.

*To all whom it may concern:*

Be it known that I, HARRY C. RAMSBERGER, a citizen of the United States, residing at the city of Philadelphia, in the county of Philadelphia and State of Pennsylvania, have invented a certain new and useful Mercury Pressure-Gage, of which the following is a specification.

It is one object of the present invention to provide a mercury pressure-gage that is light, strong, durable, and comparatively inexpensive to manufacture.

A further object is to provide a device calculated to prevent escapage of mercury.

Other objects will appear hereinafter.

The invention consists of the improvements hereinafter described and finally claimed.

The nature, characteristic features, and scope of the invention will be more fully understood from the following description, taken in connection with the accompanying drawings, forming part hereof, and in which—

Figure 1 is a side elevational view of a mercury pressure-gage embodying features of the invention, and Fig. 2 is a central sectional view of the same.

Referring to the drawings, $a$ is a tubular hollow base forming a mercury-chamber. Formed integral therewith and extending from the upper portion thereof is a lateral member $b$, having a passage through it, the outer extremity of which is tapped for the reception of the gas-pipe or system of pipes to be tested.

$c$ is a nozzle, shown as having threaded engagement with the member $b$ and provided with a suitable check-valve $d$, interposed between the interiors of the member $b$, and the casting $a$ is a screening device $e$, adapted to prevent sediment from reaching the mercury-chamber.

$f$ is a cap screwed to the upper portion of the tubular base $a$, and $g$ is a gasket interposed between the abutting surfaces of the said cap and base. Extending upwardly from the mercury-chamber through the cap $f$ is a glass indicator-tube $h$. This tube is secured to the cap $f$ by means of an elastic washer $i$ and a nut $j$, which serve as an airtight connection. Extending from the nut $j$ is a slotted and graduated tube $k$, surmounted by a cap $l$, as shown. This cap $l$ is perforated, and there is interposed between the tube $h$ and the said cap a fibrous washer $m$, which permits the admission of air and yet prevents the escapage of mercury.

To operate the above-described device, the member $b$ is attached to the pipe or system of pipes to be tested and a hand or other pump attached to the nozzle. The said pipe or system of pipes are then filled with air at the pressure substantially equal to the pressure of the gas they are designed to bear in practice. This pressure of air will cause the mercury to rise in the tube $h$, and if after a suitable interval has elapsed there is no fall of mercury in the tube the pipes are assumed to be properly and tightly joined and fitted for use. On the other hand, if in a corresponding interval of time there is a fall of mercury it is to be presumed that there is leakage present.

Among the advantages in the above-described device mention may be made of the fact that by the present construction of the mercury-chamber there is left little or no avenue of escape for the mercury. The mercury-chamber is always free from sediment by the screening device $e$. The check-valve in the nozzle $e$ takes the place of the cumbersome hand-valve now in general use and is obviously more convenient aside from the fact that it is more efficient.

Having described the nature and objects of the invention, what I desire to secure by Letters Patent is—

1. In a mercury-gage comprising a casting consisting of a tubular base forming a mercury-chamber and having formed integral therewith and projecting laterally therefrom a member having a passage through it and communicating with said chamber a screening device fitted to said passage, a nozzle and its complemental check-valve fitted to the lateral member and an indicator-tube rising from the base, substantially as described.

2. A mercury-gage comprising a casting consisting of a tubular base forming a mercury-chamber and having formed integral therewith and projecting from its upper portion a lateral member having a straight passage through it and communicating with said chamber, a screening device one end of which is fitted to the passage of the lateral member and the other end of which is located within the mercury-chamber, a nozzle and its complemental check-valve fitted to the lateral member, a cap having threaded engagement with the base and an indicator-tube supported by said cap, substantially as described.

In testimony whereof I have hereunto set my hand and seal.

HARRY C. RAMSBERGER. [L. S.]

Witnesses:
WM. GOLDEN,
FRANCIS X. CONNOLLY.